Dec. 2, 1969   V. F. ANDERSON   3,481,501
PLASTIC CONTAINER HAVING INTEGRAL MOLDED BAIL HANDLE
Filed Dec. 12, 1967   3 Sheets-Sheet 1
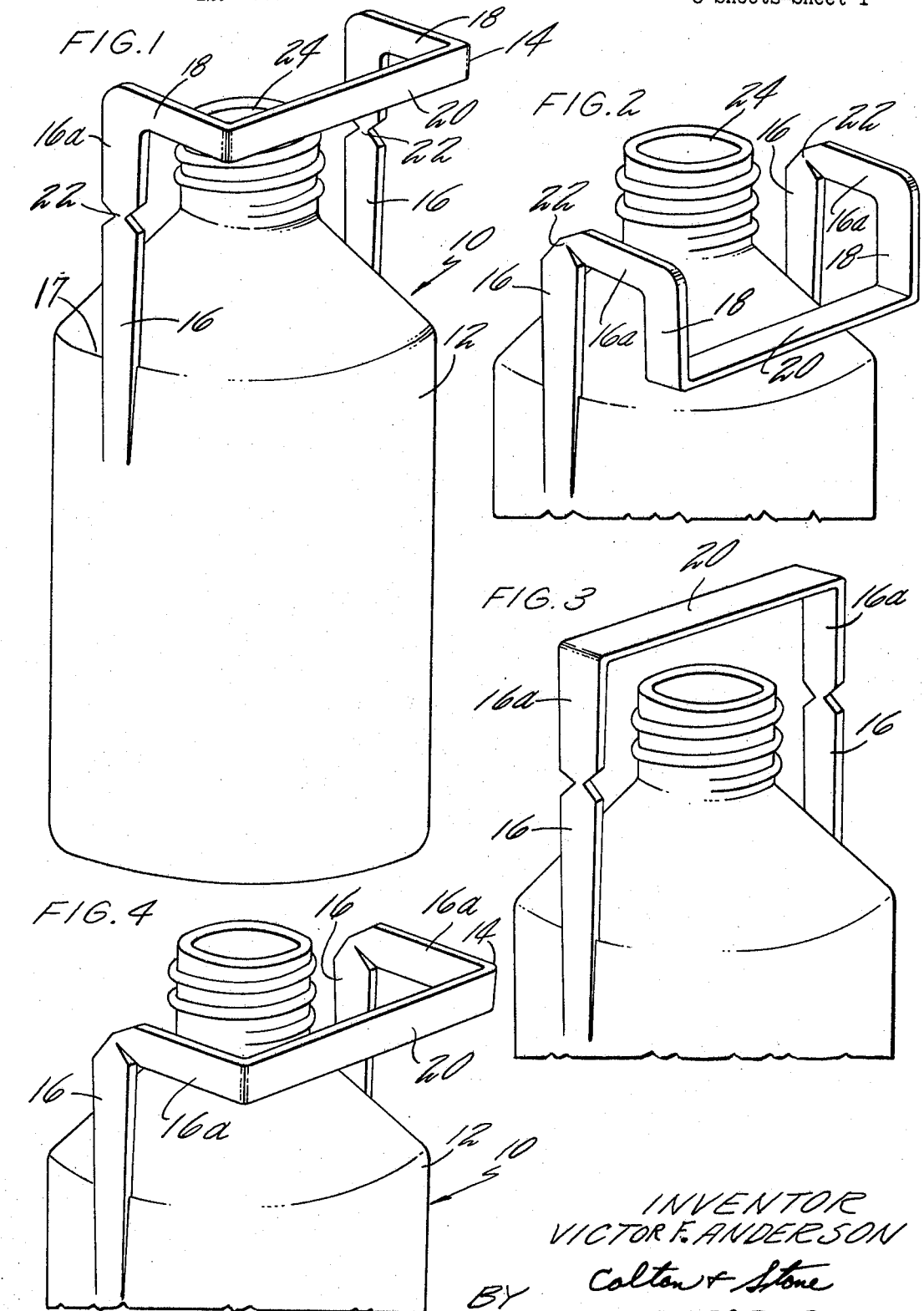
INVENTOR
VICTOR F. ANDERSON
BY Colton + Stone
ATTORNEYS

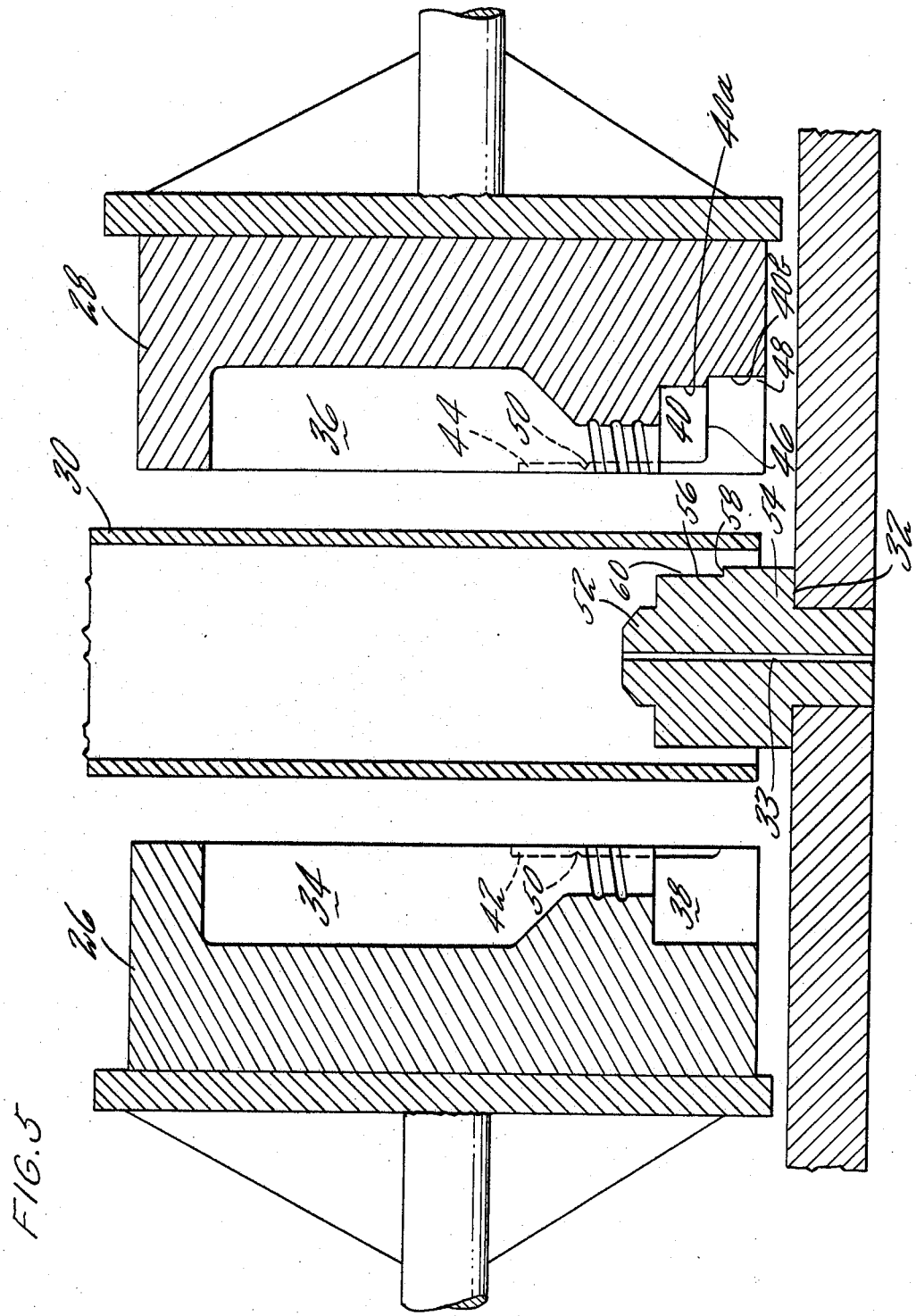

Dec. 2, 1969   V. F. ANDERSON   3,481,501
PLASTIC CONTAINER HAVING INTEGRAL MOLDED BAIL HANDLE
Filed Dec. 12, 1967   3 Sheets-Sheet 3
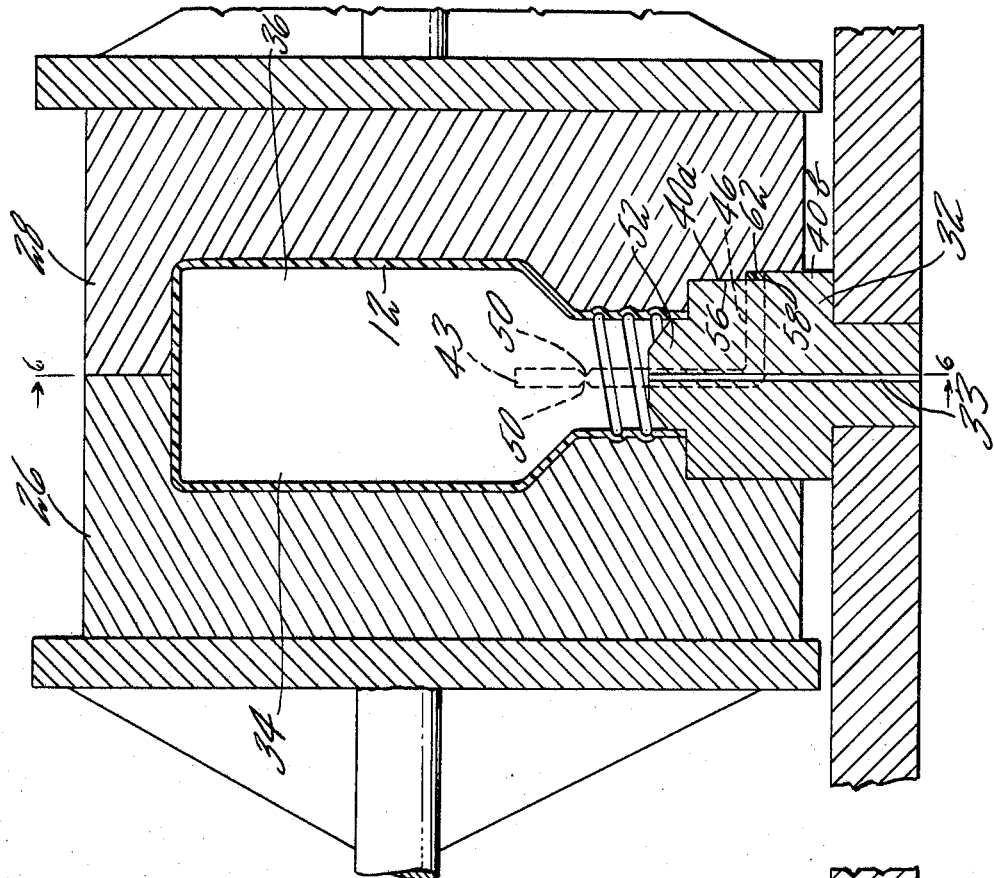
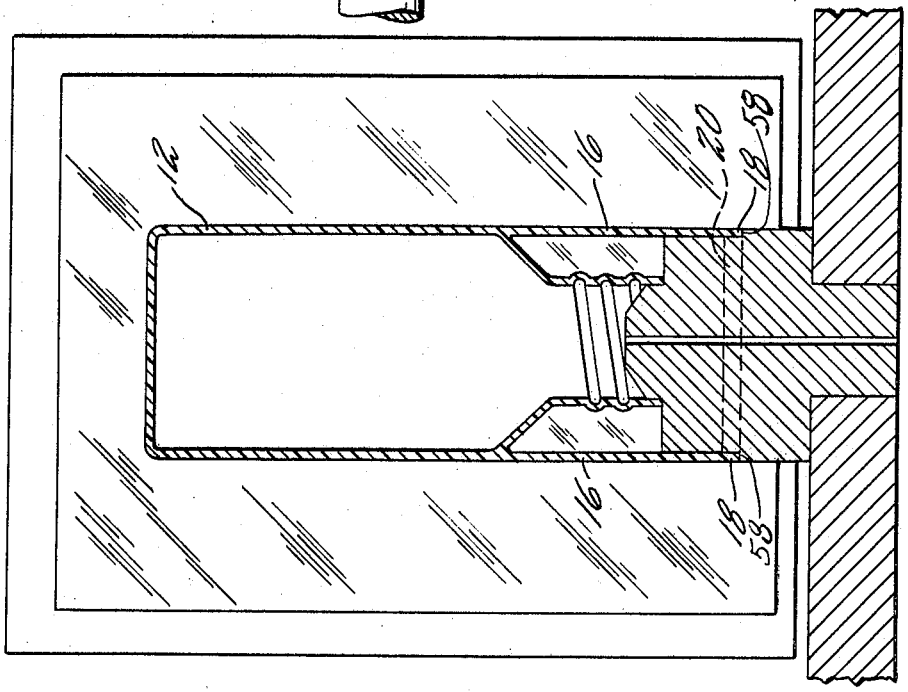

3,481,501
PLASTIC CONTAINER HAVING INTEGRAL MOLDED BAIL HANDLE
Victor F. Anderson, Wenonah, N.J., assignor to Shell Oil Company, New York, N.Y., a corporation of Delaware
Filed Dec. 12, 1967, Ser. No. 689,840
Int. Cl. B65d 1/02, 23/10
U.S. Cl. 215—100                         2 Claims

ABSTRACT OF THE DISCLOSURE

A plastic jug and the method of forming the same, the body of the jug being blow molded and the handle (bail) being compression molded by interaction between the blowing pin and the mold. The outer surface of the blowing pin is specially contoured to cooperate with a part of the mold to form a unitary bail attached to the body of the jug at the same time that the body of the jug is being blow molded.

BACKGROUND OF THE INVENTION

Field of the invention

This invention relates to the manufacture of plastic articles by concurrent blow molding and compression molding techniques. More particularly, this invention relates to plastic jugs and the method of manufacture thereof in which the body and bail of the jug are formed concurrently by blow molding and compression molding techniques, respectively.

Description of the prior art

It has long been desirable to form plastic articles, such as jugs, with integral body and bail portions. Suggestions have been made in the prior art that such plastic articles can be formed by concurrently blow molding and compression molding the body and the bail. However, these prior art articles and methods have not been satisfactory for a variety of reasons. Among these reasons has been the fact that the bail has heretofore been compression molded solely between cooperating parts of the mold, and this prior art method has required elaborate mold construction and has severely limited the type of bail produced. A severe problem with the bail has been that the normal position of the bail has crossed or bridged the opening of the jug, and this position of the bail has seriously interfered with techniques for filling the jug.

SUMMARY OF THE INVENTION

In the present invention a plastic article, such as a jug, is formed having an integral body portion and bail. The bail is formed with a hinge whereby the bail can be moved from a closed position (i.e. a stored position) to a carrying position. In the stored position the bail is out of the way of the opening of the jug so that the jug can easily be filled. Preferably, the bail is formed so that it does not cross the opening of the jug even in the carrying position of the bail so that the filling operation will not be hampered even if the bail should unintentionally be in the carrying position rather than the stored position during the filling operation. The body of the jug is formed by blow molding, and the bail of the jug is formed by compression molding. However, at least part of the compression molding to form the bail is accomplished by specially contoured surfaces on the blowing pin, thus leading to a substantial simplification of the mold.

Accordingly, one object of the present invention is to provide a novel blow molded and compression molded article.

Another object of the present invention is to provide a novel blow molded and compression molded article having a blow molded body and a compression molded bail.

Still another object of the present invention is to provide a novel blow molded jug having an integral compression molded bail, the bail normally being removed from the opening of the jug to facilitate filling of the jug.

Still another object of the present invention is to provide a novel method of manufacture of a combined blow molded and compression molded article.

Still another object of the present invention is to provide a novel method of manufacture of a blow molded jug and an integral compression molded bail wherein the compression molding of the bail occurs between the mold and specially contoured surfaces of the blowing pin.

Other objects and advantages will be apparent and understood from the following detailed description and drawings.

BRIEF DESCRIPTION OF THE DRAWINGS

FIGURE 1 is a perspective view of a preferred jug of the present invention with the bail in the carrying position.

FIGURE 2 is a perspective view of the jug of FIGURE 1 showing the bail in the closed position.

FIGURE 3 is a perspective view of another jug of the present invention showing the bail in the carrying position.

FIGURE 4 is a perspective view of the jug of FIGURE 3 showing the bail in the stored position.

FIGURE 5 is a sectional view of molding apparatus employed in the method of the present invention, the mold being shown with the mold halves separated and with the parison and the blowing pin in position.

FIGURE 6 is a view of the mold along line 6—6 of FIGURE 7.

FIGURE 7 is a view of the mold of FIGURE 5 in the closed position.

DESCRIPTION OF THE PREFERRED EMBODIMENT

Referring now to FIGURES 1 and 2, a jug 10 of the present invention has a body portion 12 and a bail portion 14. Bail 14 has a pair of legs 16 integral with and extending from diametrically opposed shoulder portions 17 of body 12, horizontal side members 18 extending from legs 16 at a 90° angle thereto and a cross bar 20 extending between side members 18. The legs 16 are formed integral with body 12 of the jug, and each of the legs 16 has a hinge 22 formed by reducing the cross-sectional area of a section of each leg to provide a pair of V-shaped notches in each leg. The entire jug is formed from moldable plastic material known in the art, such as polyethylene.

The jug shown in FIGURE 1 will serve, typically, as a milk jug. The jug will be filled through neck 24, and a sealing cap will be provided for the neck. Although neck 24 is shown as a threaded closure, it will be understood that any other type of known closure, such as a snap-on cap could also be employed. As shown in FIGURE 1, bail 14 is in the carrying position, and a person carrying the jug would grasp bail 14 along cross bar 20 to transport the jug. The jug would be molded with the bail in the position shown in FIGURE 1.

Referring now to FIGURE 2, the jug is shown with the bail in the stored position. The bail is flexed about hinge 22 whereby cross bar 20, side members 18 and the leg portions 16a above the hinges all pivot or rotate 90° with respect to their positions in FIGURE 1.

It should be observed that access to neck 24 for filling the jug is not interfered with by any part of bail 14 regardless of whether the bail is in the carrying position of FIGURE 1 or the stored position of FIGURE 2. In either position, the cross bar 20 is offset from the axis of the neck by a distance greater than the radius of the neck so that there is always a free access path to the neck. The carrying position depicted in FIGURE 1 is preferably the position in which jug 10 would be molded.

Referring now to FIGURES 3 and 4, a second but less preferred embodiment of the present invention is shown. In this embodiment the horizontal side members 18 described with respect to FIGURES 1 and 2 are omitted, and cross bar 20 is connected directly to the portions 16a of the legs above the hinges 22. FIGURE 3 shows the jug of this embodiment in the carrying position, and FIGURE 4 shows the jug in the stored position. It will be observed that the cross bar 20 is offset from the axis of the neck only in the stored position, and thus there is the possibility of interference with the filling operation if the bail is inadvertently moved to the carrying position. However, the intention is that filling will be done with the bail in the stored position of FIGURE 4. The jug of this embodiment would be molded with the bail in a position shown in FIGURE 4.

Referring now to FIGURES 5, 6 and 7, the molding apparatus employed in the present invention for molding the jug of FIGURES 1 and 2 is shown. FIGURE 5 shows left and right halves of the mold 26 and 28, respectively. The mold halves 26 and 28 are shown separated and a parison 30 is shown positioned for engagement by the mold when the mold halves are closed. Parison 30 may be any moldable plastic material, e.g. polyethylene, known in the art to be suitable for blow and compression molding, and the parison is formed and delivered to the mold in accordance with standard techniques. A blowing pin 32 is positioned to deliver air pressure internally of the parison via a central air inlet 33 for blow molding expansion.

Cavities 34 and 36 are formed in each of the mold halves 26 and 28, respectively, in standard fashion, each of the cavities defining the outer envelope of one-half of the body and neck portion of the jug. On the side of the neck removed from the body cavity, each half of the mold has a shaped recess 38 and 40. The recesses 38 and 40 can be of any particular cross-sectional shape depending on the desired final shape or configuration of the bail. As presently described, the recesses will be square or rectangular depending on the dimensioning of the various parts of the bail. Each of the mold halves has a pair of diametrically opposed groove segments 42 and 44, only one of the groove segments in each mold half being shown in FIGURE 5. The groove segments 42 and 44 are disposed parallel to the axis of the jug to be formed, and the groove segments extend from a depth in the cavity area 36 adjacent to the shoulder forming area to a shelf 46 in the periphery of recess 40. The shelf 46 defines a groove 48 extending completely along the square or rectangular mold surface defining recess 40, and it will be observed that a short length of the shelf 46 extends along the mold surface defining recess 38 to join the groove 42. Thus, the outer periphery of recess 40 is defined by vertical surfaces 40a and 40b connected in a step by a portion of shelf 46. The grooves 42 and 44 on each side of the mold cooperate in the closed position of the mold to form grooves 43 (see FIGURE 7) on opposite sides of the mold for molding legs 16. Each of the grooves 43 is provided with a necked down or V-grooved portion 50 to form the V grooves of the hinges 22.

The blowing pin 32 has a circular nozzle section 52 which fits into the circular neck portion of the mold and a rectangular body section 54. A portion of the outer periphery of blowing pin body 54 is cut away and contoured to form an L-shaped step having a vertical leg 56 and a horizontal leg 58 defining a recessed portion 60 which extends completely along one side of the blowing pin body and slightly more than half way along the two sides which join that one side.

Referring now to FIGURE 7, the mold halves are shown in the closed position after air pressure has been introduced through the central air inlet 33 to cause the parison to conform to the shape of cavities 34 and 36. As the mold is being closed, part of the parison is trapped in groove segments 42, 43 and 44 which have combined to form the single leg defining grooves on each side of the mold. When the mold is brought to the closed position, the vertical leg 56 on three surfaces of the blowing pin butts against the vertical surface 40a of recess 40, and the outer surface of the blowing pin body butts against vertical surface 40b of recess 40. The shelf 46 on the mold and the horizontal leg 58 on the blowing pin are spaced from each other whereby a rectangular cavity 62 is formed extending completely along one side of the blowing pin and slightly more than half way along the two sides of the pin joining that one side. The portions of rectangular cavity 62 extending partly along the two opposed sides of the blowing pin join the grooves 43 on opposite sides of the mold providing a path between the grooves 43 on opposite sides of the mold.

Upon the closing of the mold, part of the parison is trapped in the grooves 43 and also in the rectangular cavity 62 to thus form the legs 16, side members 18 and cross bar 20 by compression molding at the same time that the body 12 of the jug is being formed by blow molding. It will be observed that the legs 16 are integrally joined to the body of the jug since the grooves defining the legs extend into the wall of the cavity below the area which defines the shoulders 17 of the jug body.

Referring now to FIGURE 6, a view is shown of the mold along line 6—6 of FIGURE 7. The legs 16 can be seen extending from the body 12 to the side members 18 which are in turn joined by cross bar 20.

As should be apparent to those skilled in the art, bails of various sizes and shapes can be formed in accordance with the present invention by selectively contouring the grooves 43 and the rectangular cavity 62 defined between the contoured surface of the blowing pin and the mold.

While a preferred embodiment has been shown and described, various modifications and substitutions may be made without departing from the spirit and scope of this invention. Accordingly, it is to be understood that this invention has been described by way of illustration rather than limitation.

What is claimed is:
1. A hollow plastic container having:
a blow molded body and neck; and
a compression molded bail integral with and extending from said body;
said bail having a pair of legs with hinges therein and a carrying cross bar connected to said legs by side members angled with respect to said legs, said cross bar being pivotable about said hinges between a stored position and a carrying position, and said cross bar being offset from the axis of said body in both said stored position and said carrying position.
2. A hollow plastic container as in claim 1 wherein said legs extend from the juncture of a side and shoulder area of said body, and wherein said hinges are V-grooved areas of reduced thickness in said legs.

References Cited

UNITED STATES PATENTS

| | | | |
|---|---|---|---|
| 3,285,454 | 11/1966 | Bailey | 215—100 |
| 3,369,690 | 2/1968 | Hayes | 215—100 |
| 3,384,258 | 5/1968 | Singier | 215—100 |

FOREIGN PATENTS 789,362  7/1968  Canada.

GEORGE T. HALL, Primary Examiner

U.S. Cl. X.R.

215—1; 220—94